United States Patent
Chan (10) Patent No.: US 10,303,262 B2
(45) Date of Patent: May 28, 2019

(54) METHOD AND INPUT DEVICE FOR SETTING FUNCTION KEYS

(71) Applicant: KYE SYSTEMS CORP., New Taipei (TW)

(72) Inventor: Chi-Wai Chan, New Taipei (TW)

(73) Assignee: KYE SYSTEMS CORP., New Taipei (TW)

(*) Notice: Subject to any disclaimer, the term of this patent is extended or adjusted under 35 U.S.C. 154(b) by 239 days.

(21) Appl. No.: 15/360,842

(22) Filed: Nov. 23, 2016

(65) Prior Publication Data
US 2018/0024646 A1    Jan. 25, 2018

(30) Foreign Application Priority Data

Jul. 21, 2016    (TW) ............................. 105123066 A (51) Int. Cl.
| | | |
|---|---|---|
| *G06F 3/02* | (2006.01) | |
| *G09G 5/00* | (2006.01) | |
| *G06F 3/023* | (2006.01) | |
| *G06F 3/0482* | (2013.01) | |
| *G06F 3/0484* | (2013.01) | |
| *G06F 9/451* | (2018.01) | |
| *G01S 19/13* | (2010.01) | |

(52) U.S. Cl.
CPC .......... *G06F 3/0238* (2013.01); *G06F 3/0227* (2013.01); *G06F 3/0482* (2013.01); *G06F 3/04847* (2013.01); *G06F 9/454* (2018.02); *G01S 19/13* (2013.01)

(58) Field of Classification Search
CPC .. G01S 19/13; G06F 17/30887; G06F 3/0227; G06F 3/0238; G06F 3/0482; G06F 3/04847; G06F 9/454; H04J 1/00
See application file for complete search history.

(56) References Cited

U.S. PATENT DOCUMENTS

| 2012/0200493 A1* | 8/2012 | Garfio ................... G06F 1/1626 345/156 |
| 2013/0073553 A1* | 3/2013 | Obayashi ............ G06F 17/3087 707/737 |

* cited by examiner

*Primary Examiner* — Insa Sadio
(74) *Attorney, Agent, or Firm* — Maschoff Brennan (57) ABSTRACT

Disclosed herein are a method and an input device for setting function keys. Information of latitude and longitude related to the input device is obtained by a network positioning method or a method of global positioning system and position information is obtained according to the information of latitude and longitude. Macro data related to the position information are selected from a macro database. Functions of the function key are assigned according to the selected macro data.

12 Claims, 5 Drawing Sheets

METHOD AND INPUT DEVICE FOR SETTING FUNCTION KEYS

CROSS-REFERENCE TO RELATED APPLICATIONS

This non-provisional application claims priority under 35 U.S.C. § 119(a) on Patent Application No(s). 105123066 filed in Taiwan, R.O.C. on Jul. 21, 2016, the entire contents of which are hereby incorporated by reference.

BACKGROUND

Technical Field

This disclosure relates to a method and an input device for setting function keys, and more particularly to a method and an input device for setting function keys according to position information.

Related Art

The penetration rate of computer gets higher year by year. This trend indicates that modern people are more and more used to using computers for work, communication, information searching, and entertainment. To input information to the computers, input devices, such as keyboards, mouse devices, and touch pens, are commonly used. A modern keyboard usually includes letter keys, symbolic keys, a Spacebar, a Backspace, an Enter key, one or more Shift keys, one or more Control keys, one or more Alt keys and some function keys such as F1-F12 etc. Besides a left mouse button, a middle mouse button and a right mouse button, a mouse device can be disposed with other function keys. For a touch pen, in addition to an on/off switch, function keys can be disposed for practical requirements.

Keyboards, mouse devices or touch pens used around the world just have similar layouts of keys, so the keyboards, the mouse devices, or the touch pens in the same style can be usually sold to multiple regions; even so, functions corresponding to function keys of the keyboard, the mouse device, or the touch pen still need be adjusted due to the differences in language, culture, and usage habit between different sale regions. The above situation causes the inconvenience of operating these input devices.

SUMMARY

According to one or more embodiments of this disclosure, a method for setting function keys of an input device includes obtaining a information of latitude and longitude related to the input device by a network positioning method or a method of global positioning system (GPS); obtaining a position information according to the information of latitude and longitude; selecting multiple macro data related to the position information from a macro database; and according to the selected macro data, assigning the corresponding functions to the function keys of the input device.

According to one or more embodiments of this disclosure, an input device for setting function keys includes multiple function keys, a transmission interface and a microprocessor. The transmission interface is electrically connected to a computer. The microprocessor obtains information of latitude and longitude related to the input device by a network positioning method or a method of global positioning system (GPS), obtains position information according to the information of latitude and longitude, and selects multiple macro data related to the position information from a macro database. In addition, the microprocessor assigns corresponding functions to the function keys of the input device.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
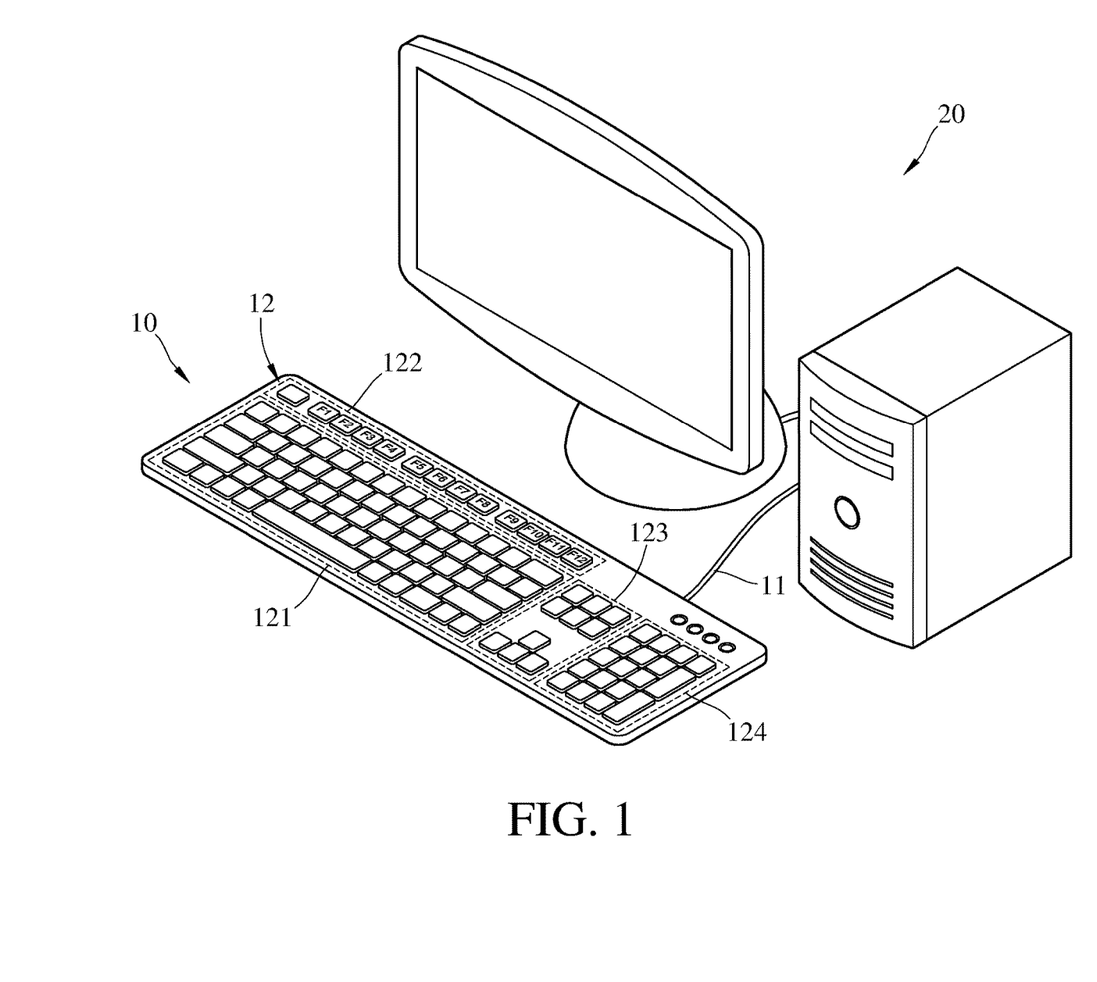
FIG. 1 is a schematic diagram of using a keyboard in an embodiment of this disclosure.
Figure 2:
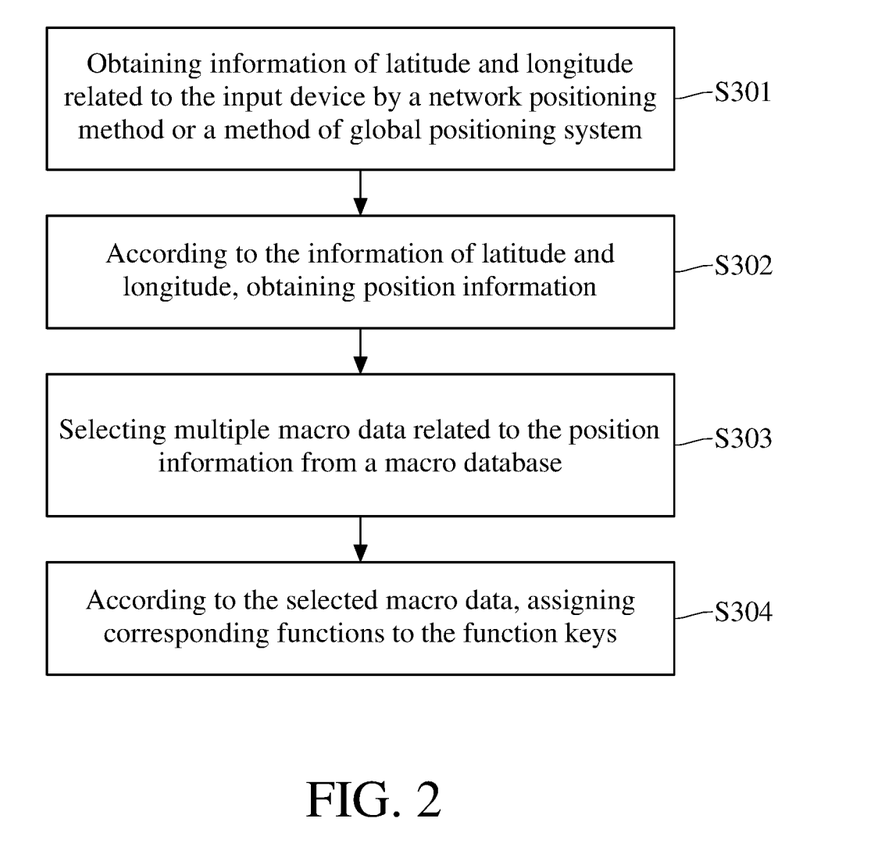
FIG. 2 is a flow chart of a method for setting function keys in an embodiment of this disclosure.

Please refer to FIG. 1 and FIG. 2. FIG. 1 is a schematic diagram of using a keyboard in an embodiment of this disclosure, and FIG. 2 is a flow chart of a method for setting function keys in an embodiment of this disclosure. As shown in the figures, the method for setting function keys is carried out by an executable program, and pre-stored in the input device, for example. When the input device is electrically connected to a computer 20 via a transmission interface 11, the running program in the input device is installed in and executed on the computer 20. In another embodiment, the executable program carrying out the method for setting function keys is installed in the computer 20 via computer-readable mediums, software or other suitable mediums. This disclosure does not intend to limit the kind of medium for installing the executable program. For example, the input device is a keyboard, a mouse, a touch pen or other suitable device. For convenience, a keyboard 10 is described as an example hereafter, but is not to limit the embodiment.

The keyboard 10 includes a key array 12 which is approximately divided into several regions: a region of typing keys 121, a region of function keys 122, a region of edit keys 123, and a region of numeric keys 124. The region of typing keys 121 for example includes letter keys, symbolic keys, a Spacebar, a Backspace key, a Caps Lock key, an Enter key, one or more Shift keys, one or more Control keys and one or more Alt keys. The region of function keys 122 is located above the region of typing keys 121 and the function keys F1-F12 are configured to set commonly-used control instructions, for example. The region of edit keys 123 for example is located on the right side of the region of typing keys 121 and includes arrow keys, an Insert key, a Delete key, a Home key, an End key, an Escape key, a Page Up key and a Page Down key. The region of numeric keys 124, which is referred to numeric keypad 124 hereafter, for example is located on the right side of the region of function keys 122. The numeric keypad 124 includes numeric keys, a Num Lock key, an Enter key and symbolic keys. Person having ordinary skill in the art is able to design the kinds and the locations of keys of the key array 12, and this disclosure does not intend to limit the kinds and the locations of keys.

In an embodiment, when the keyboard 10 is electrically connected to the computer 20 via the transmission interface 11, the computer 20 executes the executable program prestored in the keyboard 10 to perform the following steps of setting the function keys of the keyboard 10. In another embodiment, the executable program is directly installed in the computer 20 and performs the following steps of setting the function keys of the keyboard 10. In step S301, the executable program obtains information of latitude and longitude related to the keyboard 10 by a network positioning method or a method of global positioning system (GPS). The information of latitude and longitude related to the keyboard 10 is the information of latitude and longitude of the location of the keyboard 10 or the information of latitude and longitude of the location of the user who operates the keyboard 10. In the case of the network positioning method, the executable program obtains the information of latitude and longitude related to keyboard 10 from the computer 20. For example, the executable program obtains an Internet Protocol address (IP address) for the connection between the executable program and the Internet via the computer 20, and searches for the information of latitude and longitude of the location of the keyboard 10 from the database of an external server according to the IP address. In step S302, according to the information of latitude and longitude, the executable program searches for position information which relates to the information of latitude and longitude of the keyboard 10 from the database of the external server. For example, the position information is information of latitude and longitude, a country, a city, a region or other position information. In another embodiment, the keyboard 10 or the computer 20 has a built-in GPS module. The executable program obtains the information of latitude and longitude of the located region of the keyboard 10 via the GPS module, and searches for the country, the region or the city related to the above information of latitude and longitude from the database of the external server via the computer 20. This disclosure does not intend to limit the kind of the position information.

In step S303, after the executable program obtains the position information, the executable program selects multiple macro data related to the position information from a macro database. The executable program, for example, is connected to the external server via the computer 20, and selects multiple macro data related to the position information from the macro database of the server. For example, when the keyboard 10 is located in Taiwan, the executable program searches for multiple macro data, commonly used by Taiwanese, from the macro database and sends the found macro data to the computer 20. In an embodiment, the macro database includes a uniform resource locator (URL) database. Information stored in the URL database is classified based on the attributes of URLs into, for example, a social networking category, a news category, a web portal category, a shopping website category and a search engine category. The executable program searches for URL information of websites commonly used by Taiwanese from the URL database and sends the found URL information to the computer 20. The URL information is, for example, the logo, URL or other suitable information of a website.

In step S304, the executable program assigns the corresponding functions to the function keys according to the selected macro data. For example, the executable program obtains twelve pieces of macro data commonly used by Taiwanese from the macro database Then, according to the utility rate of each macro data, the executable program orderly assigns a piece of macro data with the highest utility rate to the function key F1, assigns a piece of macro data with the second highest utility rate to the function key F2, and so on. However, this disclosure does not intend to limit the correlation between the macro data and the function keys. Besides the utility rate, the function keys F1-12 are dynamically set according to the user's needs.

In practice, when a function key of the keyboard 10 is selected, the computer 20 executes a function according to the macro data which corresponds to the selected function key. In an embodiment, the macro data includes a control instruction and URL information. When the computer 20 executes the function according to the macro data, the computer 20 opens an application program according to the control instruction, and inputs the URL information into an operating interface provided by the application program to open a web page related to the URL information. For example, when the function key F1 is selected, the computer 20 starts the default browser, which is a kind of application program, and opens the related web page in the browser according to the URL information of the function keys F1. In other words, by the executable program, the computer 20 is capable of searching for the commonly-used name of one or more websites according to the current location of the keyboard 10 and assigning the related URL information to the function key of the keyboard 10 according to the commonly-used name of one or more websites.

In an embodiment, when the computer 20 attempts to open the application interface according to the related URL information corresponding to the selected function key, the application program provides the application interface according to the position information. For example, the website commonly used by Taiwanese to search for the information about the weather is Yahoo Weather. When the browser opens the web page of Yahoo Weather, the executable program further narrows the range of located region according to the position information. For example, the executable program narrows the range of located region from Taiwan to Taipei and asks Yahoo Weather for the information about the weather in Taipei.

In another embodiment, in addition to the related information of one or more commonly-used websites at the location of the keyboard 10, the macro data also includes a control instruction and parameter information. More specifically, after the executable program obtains the position information related to the location of the keyboard 10, the executable program, for example, selects a game and game character setting files of the game, which are popular at the location of the keyboard 10, from a game database. In an embodiment, the executable program is capable of downloading a game character setting file according to the popularity of the game characters in a locally-popular game, and assigning the downloaded setting file and the game character therein to the related function key. In another embodiment, a user is able to select a favorite game character from the game characters provided by the executable program. Then, the executable program downloads the setting file of the selected game character and assigns the setting file and the game character therein to the related function key.

A game program is a kind of application program, and provides an operating interface for selecting the game character. When the computer 20 executes the game program and the function key F1 is selected, the executable program sets the parameter of the game character in the game program according to the game character setting file corresponding to the function key F1 in order to simplify the process of selecting a game character during the execution of the game program. A combination of another control instruction and parameter information is set as the macro data corresponding to another function key. For example, the macro data is a combination of an inputting instruction and the number of players or a combination of an inputting instruction and the name of a player. In other words, in the game, the player may fast input one or more relevant settings of the game by selecting one or more function keys. As another practical example, the macro data is a commonly-used character string inputted when a function key is selected during the execution of a text editor on the computer 20. When the computer 20 executes an email program and a function key is selected, the email account and its password are automatically input. Person having ordinary skill in the art is able to design macro data for the practical requirements, and this disclosure does not intend to limit the type, content or the like of the macro data.

Figure 3:
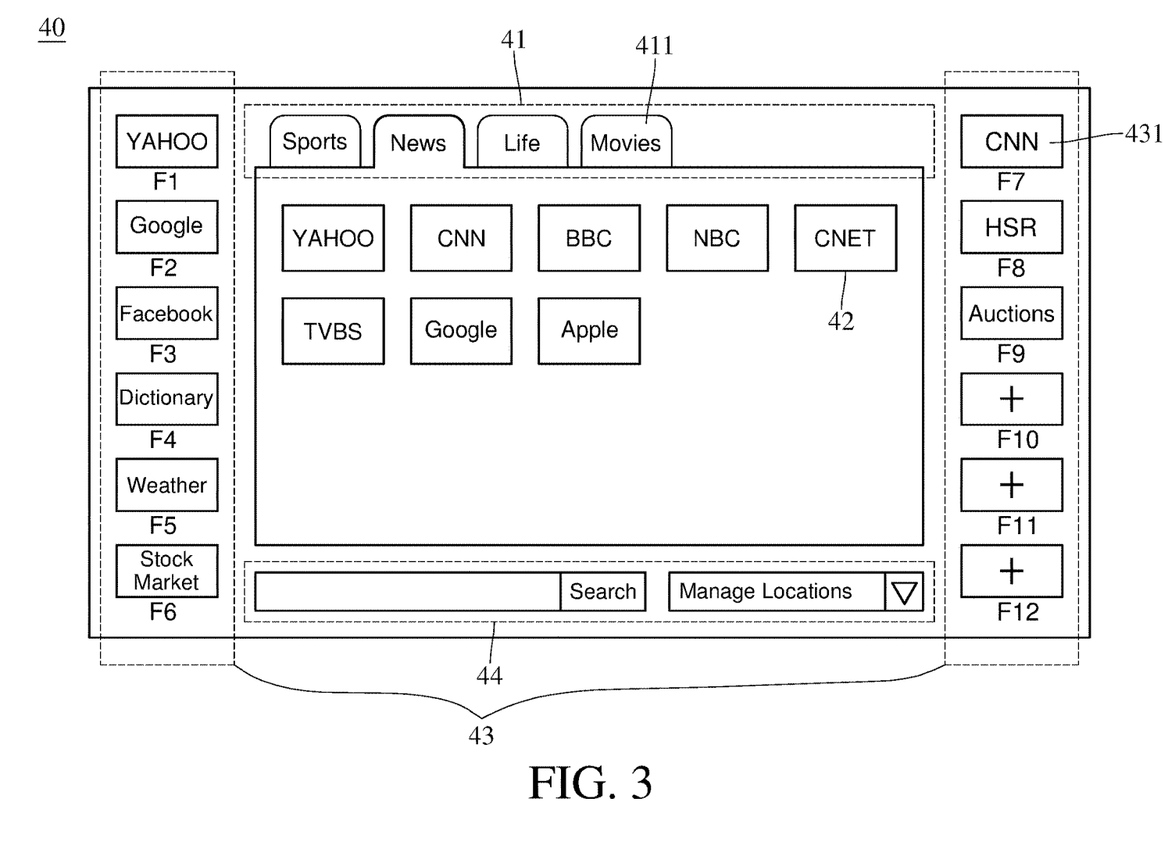
FIG. 3 is a schematic diagram of a uniform resource locator (URL) category table and a function allocation table in another embodiment of this disclosure.
Figure 4:
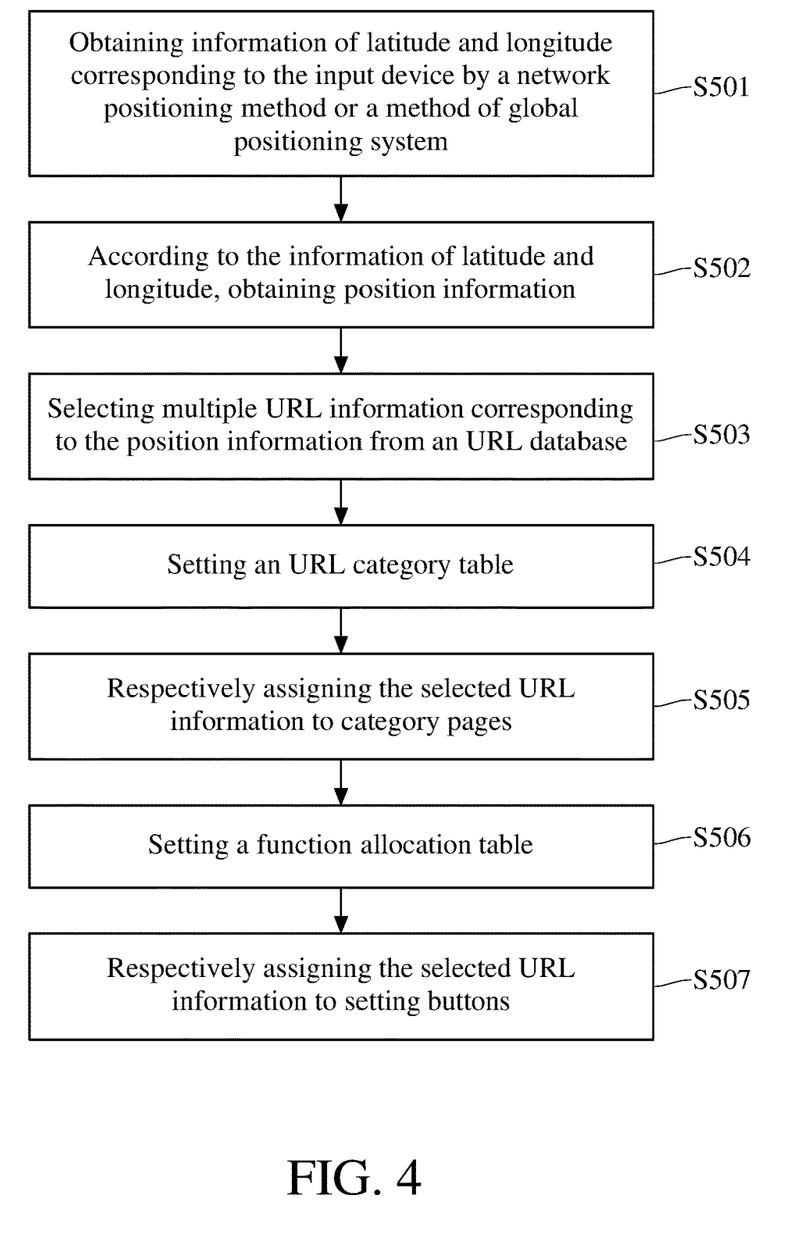
FIG. 4 is a flow chart of a method for setting function keys in another embodiment of this disclosure.

To explain the method and the input device for setting function keys more clearly, the following one or more embodiments are exemplarily illustrated in the case of the macro data used to start a browser and command the browser to open the web page corresponding to the URL information of the function key. The disclosure does not intend to limit the use of the macro data. Please refer to FIG. 3 and FIG. 4. FIG. 3 is a schematic diagram of a URL category table and a function allocation table in another embodiment of this disclosure, and FIG. 4 is a flow chart of a method for setting function keys in another embodiment of this disclosure. As shown in the figures, when an input device is electrically connected to a computer via a transmission interface, the computer executes a pre-stored executable program of the input device. In another embodiment, the executable program is installed on the computer and is executed. In step S501, the executable program asks the computer for the information of latitude and longitude related to the input device by a network positioning method or obtains the information of latitude and longitude of the input device via the built-in GPS module of the input device. In step S502, according to the information of latitude and longitude, the executable program obtains the position information which is related to the input device. In step S503, after the executable program obtains the position information, the executable program is connected to an external server via the computer, for example, and selects a plurality of macro data related to the position information from a macro database of the server. The macro data, for example, includes a control instruction for starting a default browser, and URL information for Internet connection. In other words, the executable program, for example, selects a plurality of URL information which is related to the position information from the URL database, and respectively sets one of the URL information and the control instruction for starting a browser as a piece of macro data.

In step S504, the executable program provides a setting interface 40 which is displayed on a computer screen, and sets a macro category table on the setting interface. In this embodiment, the macro category table is, for example, an URL category table 41. The URL category table 41 includes category pages 411 of various categories, such as sports, news, life, movies, economy, weather or other suitable categories. In step S505, the executable program assigns one or more URL information 42, which is obtained according to the position information, to the URL category table 41. In other words, the setting interface 40 classifies the selected URL information and assigns them to the category pages 411 according to the category of each of the selected URL information. As shown in the figures, there is multiple URL information 42, such as Yahoo, CNN and BBC, which are famous news media, in the category page 411 of news.

In step S506, the executable program further sets a function allocation table 43 on the setting interface 40. The function allocation table 43 includes setting buttons 431 which respectively corresponds to the function keys F1-F12. In step S507, the executable program respectively assigns the selected plurality of URL information 42 to the setting buttons 431 so that the URL information 42 of each function key is displayed in the function allocation table 43. When a function key of the input device is selected, the computer opens a browser according to the macro data which corresponds to the selected function key and provides web page in the browser according to the URL information 42 corresponding to the selected function key.

As a practical example, when the input device is connected to the computer via the transmission interface, the executable program of the input device drives the computer to open the setting interface 40 of the input device. The setting interface 40 includes the URL category table 41 and the function allocation table 43. The URL category table 41 includes URL categories, such as sports, news, life, movies, economy, weather or other suitable categories. When the executable program selects the multiple URL information 42 according to the location of the input device, such as Taiwan, the executable program classifies the multiple URL information 42 into categories of the URL category table 41, and searches for twelve websites, commonly used by Taiwanese, from the URL database. Then, according to the utility rate of the websites, the executable program orderly sets the function keys F1 as the related website with the highest utility rate, the function keys F2 as the related website with the second highest utility rate, and so on. After that, for example, when the user selects the function key F3 of an input device, the computer starts a browser, and displays a website corresponding to the function key F3 in the browser.

In practice, the URL information 42 in the function allocation table 43 are also included in the URL category table 41 so that the user is able to delete, add, modify the URL information 42 in the function allocation table 43, and is able to select other URL information 42 from the URL category table 41 so that the selected URL information 42 will be recorded into the function allocation table 43. In the above embodiment, it's for convenience to describe the method that the executable program orderly assigns the URL information 42 to the related function keys according to the utility rate of the websites. For practical requirements, person having ordinary skill in the art is able to assign the URL information to the related function keys by other methods.

In an embodiment, the setting interface 40 further provides a menu of conditions 44, which allows the user to indicate a condition instruction, such as managing a location setting. More specifically, URL information 42 in the URL category table 41 is selected according to the location of the input device. The users are able to change the location into other one via the menu of conditions 44. Then, the executable program selects URL information 42, which is commonly used at the new location, from the URL database and records the selected URL information 42 to the URL category table 41 or the function allocation table 43. In another embodiment, the menu of conditions 44 further provides a searching function. By the searching function, the user is able to add habitually-used URL information to the URL category table 41 or the function allocation table 43. In this way, the user is able to assign the URL information 42 to a related function key according to the user's preference.

Figure 5:
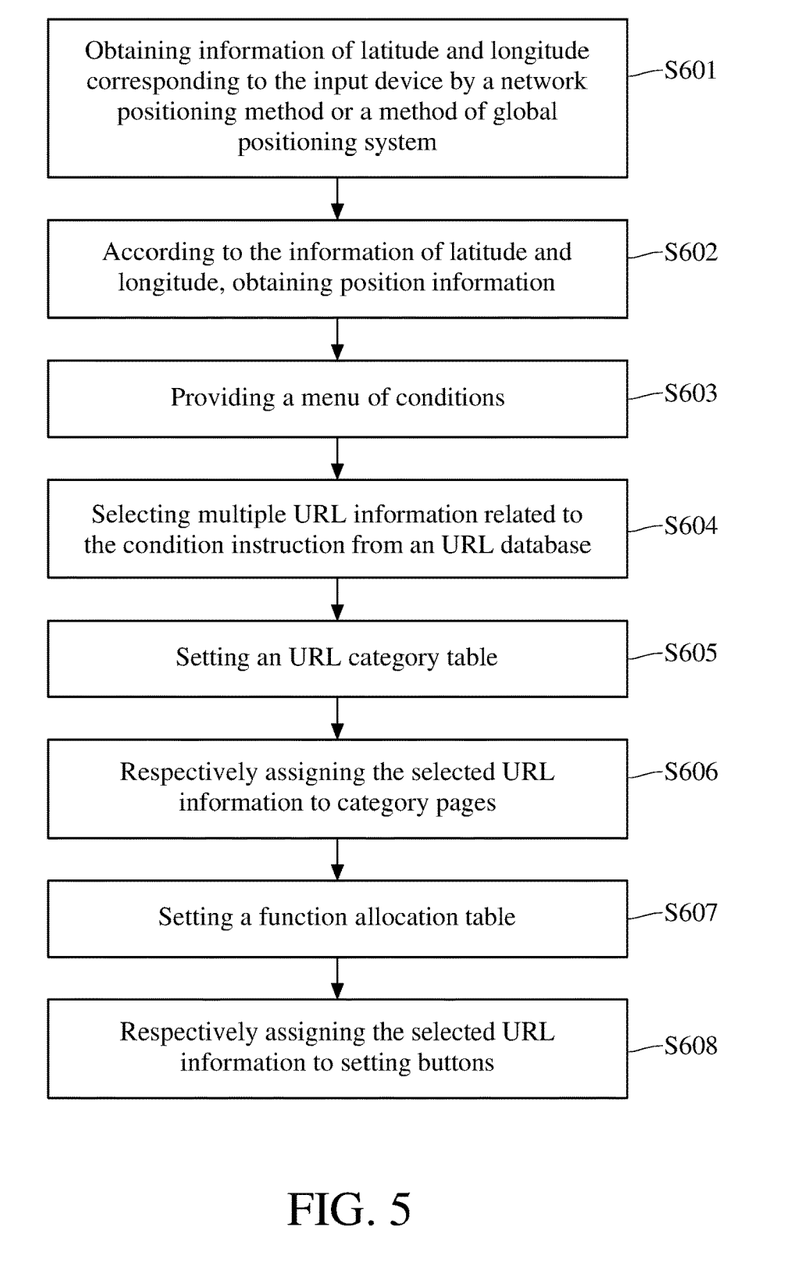
FIG. 5 is a flow chart of a method for setting function keys in yet another embodiment of this disclosure.

The following is another embodiment for assigning the URL information to a related function key. Please refer to FIG. 5, which is a flow chart of a method for setting function keys in yet another embodiment of this disclosure. As shown in FIG. 5, when an input device is electrically connected to a computer via a transmission interface, the computer executes an executable program pre-stored in the input device. In another embodiment, the executable program is installed on the computer and is executed. In step S601, the executable program asks the computer for the information of latitude and longitude related to the input device by a network positioning method, or obtains the information of latitude and longitude of the input device via a built-in GPS module of the input device. In step S602, according to the information of latitude and longitude, the executable program obtains position information which is related to the input device. In step S603, the executable program provides a menu of conditions in advance so that a user is able to indicate a condition instruction via the menu of conditions. In step S604, the executable program selects multiple URL information, related to the condition instruction indicated by the user, from an URL database. In other words, when the computer executes the executable program pre-stored in the input device, the user is able to indicate how the executable program collects the URL information of an URL category table and the URL information of a function allocation table. For example, the URL information is provided according to position information of the location of the input device, or according to the location selected by the user. In practice, if the user is a Taiwanese using the input device in the United States, the user is able to instruct the executable program to provide URL information commonly used in the United States, Taiwan or other locations by the menu of conditions.

Afterwards, in step S605, the executable program provides a setting interface displayed on a computer screen, and sets an URL category table on the setting interface. In step S606, the executable program assigns the selected multiple URL information to the category pages. In step S607, the executable program further sets a function allocation table on the setting interface. In step S608, the executable program respectively assigns the selected multiple URL information to the setting buttons so that the URL information of each function key is recorded in the function allocation table. Herein, when one of the function keys of the input device is selected, according to the macro data related to the selected function key, the computer opens a browser and provides a website page related to the URL information corresponding to the selected function key in the browser. The steps S605-S608 in this embodiment are exemplarily explained in the aforementioned embodiments so the details are not described again.

In the aforementioned embodiments, it is only for an exemplary description to carry out the method for setting function keys by an executable program. In another embodiment, the input device includes a microprocessor which is configured to automatically set function keys. In other words, the microprocessor of the input device assigns one piece of macro data to each of related function keys. Moreover, when one of the function keys is selected, the microprocessor sends a control instruction to a computer according to the macro data and commands the computer to start a browser and open a website corresponding to the function key.

In view of the above statement, this disclosure provides a method and input device for setting function keys, which are capable of automatically assigning macro data to related function keys according to local usage habits at the location of the input device. As a result, the input device is capable of providing the function keys which more fit user's needs according to local usage habits even if the input device is used in a variety of locations.

What is claimed is:

1. A method for setting function keys of an input device, comprising:
    electrically connecting a computer to the input device;
    obtaining information of latitude and longitude related to the input device by a network positioning method or a method of global positioning system;
    according to the information of latitude and longitude, obtaining position information;
    electrically connecting an external server by the computer, and selecting a plurality of macro data related to the position information from a macro database of an external server; and
    downloading the plurality of selected macro data from the external server, assigning and allocating the plurality of macro data to each of function keys so that each of the function keys is configured to execute corresponding function
    wherein one of the macro data comprises a control instruction and parameter information and the parameter information is inputted according to the control instruction via an operating interface provided by an application program when one of the function keys is selected; or one of the plurality of macro data comprises a control instruction and an uniform resource locator (URL) information and an application program is executed according to the control instruction and an operating interface related to the URL information is provided by the application program when one of the function keys is selected.

2. The method according to claim 1, wherein after selecting the plurality of macro data related to the position information, the method further comprises:
    setting a macro category table comprising a plurality of category pages; and
    respectively assigning the plurality of macro data to the plurality of category pages.

3. The method according to claim 1, wherein the operating interface is provided according to the position information by the application program.

4. The method according to claim 1, wherein the operating interface is provided according to the position information by the application program.

5. The method according to claim 1, wherein assigning the corresponding functions to the function keys of the input device comprises:
    setting a function allocation table, wherein the function allocation table comprises a plurality of setting buttons, and the plurality of setting buttons respectively corresponds to the function keys; and
    respectively assigning the plurality of macro data to the plurality of the setting buttons.

6. The method according to claim 1, further comprising:
    providing a menu of conditions for indicating a condition instruction;
    providing at least one of the plurality of macro data related to the condition instruction from the macro database.

7. An input device for setting function keys, comprising:
the function keys;
a transmission interface electrically connected to a computer; and
a microprocessor configured to obtain information of latitude and longitude related to the input device by a network positioning method or a method of global positioning system, obtain position information according to the information of latitude and longitude, electrically connect to an external server, select and download a plurality of macro data related to the position information from a macro database of the external server according the position information, and assign and allocate the plurality of macro data to each of function keys so that each of the function keys is configured to execute corresponding functions;
wherein one of the plurality of macro data comprises a control instruction and parameter information and the input device inputs the parameter information in an operating interface provided by an application program according to the control instruction when one of the function keys is selected; or one of the plurality of macro data comprises a control instruction and a URL information and the input device further executes an application program according to the control instruction and provides an operating interface related to the URL information when one of the function keys is selected.

8. The input device according to claim 7, wherein after the microprocessor selects the plurality of macro data, the microprocessor further sets a macro category table that comprises a plurality of category pages, and the microprocessor respectively assigns the plurality of macro data to the plurality of category pages.

9. The input device according to claim 7, wherein the operating interface is provided according to the position information by the application program.

10. The input device according to claim 7, wherein the operating interface is provided according to the position information by the application program.

11. The input device according to claim 7, wherein when the microprocessor assigns the corresponding functions to the function keys of the input device, the microprocessor sets a function allocation table comprising a plurality of setting buttons that respectively corresponds to the function keys, and the microprocessor respectively assigns the plurality of macro data to the plurality of setting buttons.

12. The input device for setting function keys according to claim 7, wherein the microprocessor further provides a menu of conditions, used for indicating a condition instruction, and provides at least one of the plurality of macro data related to the condition instruction from the macro database.

* * * * *